(12) United States Patent
Roach et al.

(10) Patent No.: US 12,109,469 B2
(45) Date of Patent: Oct. 8, 2024

(54) SYSTEMS AND METHODS FOR ADDITIVE MANUFACTURING OF A GOLF CLUB HEADCOVER

(71) Applicant: Cobra Golf Incorporated, Carlsbad, CA (US)

(72) Inventors: Ryan L. Roach, Encinitas, CA (US); Cameron J. Day, Vista, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 780 days.

(21) Appl. No.: 17/012,837

(22) Filed: Sep. 4, 2020

(65) Prior Publication Data

US 2024/0091611 A1 Mar. 21, 2024

(51) Int. Cl.
*A63B 60/62* (2015.01)
*B33Y 80/00* (2015.01)

(52) U.S. Cl.
CPC .............. *A63B 60/62* (2015.10); *B33Y 80/00* (2014.12); *A63B 2209/08* (2013.01)

(58) Field of Classification Search
CPC ...... A63B 60/62; A63B 2209/08; B33Y 80/00
USPC ........................................................ 150/160
See application file for complete search history.

(56) References Cited

U.S. PATENT DOCUMENTS

| 5,437,320 | A | * | 8/1995 | Sung | A63B 60/62 150/160 |
| 2004/0261924 | A1 | * | 12/2004 | Bradshaw | A63B 60/62 150/160 |
| 2005/0016648 | A1 | * | 1/2005 | Vakharia | A63B 60/62 150/160 |
| 2007/0102081 | A1 | * | 5/2007 | Hooley | A63B 53/04 150/160 |
| 2012/0261043 | A1 | * | 10/2012 | Yanoff | A63B 60/62 700/119 |
| 2013/0166405 | A1 | * | 6/2013 | Mitzel | G06Q 30/00 150/160 |
| 2020/0171753 | A1 | * | 6/2020 | Satko | A61B 17/866 |
| 2021/0146207 | A1 | * | 5/2021 | Burgess | A63B 55/57 |

FOREIGN PATENT DOCUMENTS

| GB | 2350304 A | * | 11/2000 | ............. A63B 60/62 |
| GB | 2522576 A | * | 7/2015 | ............ A63B 55/007 |

* cited by examiner

*Primary Examiner* — Don M Anderson
*Assistant Examiner* — Jessica Kavini Tamil
(74) *Attorney, Agent, or Firm* — Quarles & Brady LLP

(57) ABSTRACT

A headcover for a golf club includes a body formed layer by layer upon a build plane during an additive manufacturing process. The body defines a chamber adapted to receive a golf club head and includes a heel end, a toe end, and a plurality of sidewalls. The headcover further includes a lattice structure formed unitarily on a portion of the body during the additive manufacturing process. The lattice structure extends over at least a portion of each of the plurality of sidewalls and the toe end of the body.

20 Claims, 16 Drawing Sheets

SYSTEMS AND METHODS FOR ADDITIVE MANUFACTURING OF A GOLF CLUB HEADCOVER

CROSS REFERENCE TO RELATED APPLICATIONS

Not applicable.

REFERENCE REGARDING FEDERALLY SPONSORED RESEARCH OR DEVELOPMENT

Not applicable.

SEQUENCE LISTING

Not applicable.

BACKGROUND

1. Field of the Disclosure

The present disclosure relates to headcovers for golf clubs, and, more specifically, to headcovers that are manufactured via 3-D printing or another additive manufacturing technique.

2. Description of the Background of the Disclosure

A headcover is used to store and protect the heads of a golf club when the club is not in use. Headcovers are widely produced for many types of golf clubs (e.g. irons, drivers, fairway woods, utility irons, hybrids, putters, etc.). The two common types are sock-type headcovers and fitted headcovers. Sock-type headcovers comprise loose-fitting knit structures that do not maintain their three-dimensional shape when removed from the club head. Fitted covers are made of stiffer materials that define a three-dimensional shape to enclose a golf club head.

Conventional headcovers may suffer from a number of deficiencies. For example, both sock-type and fitted headcovers can make it difficult for a golfer to identify the type of covered club. Also, if a wet club is covered, a headcover of the prior art may absorb moisture and slow evaporation, which can promote the formation of mold, mildew, or rust on the club head.

Conventional sock-type headcovers only offer limited impact protection. These covers are also highly susceptible to snagging and tearing when being donned/doffed from a club, and they are unable to retain their form upon removal from a club head.

Conventional fitted headcovers may provide better impact protection relative to sock-type headcovers. However, fitted headcovers can be difficult to remove from the club head, particularly when made from stiffer materials such as neoprene, leather, vinyl, and the like. A rigid material resists the folding and deformation necessary for the large head of a club to be removed. Fitted headcovers also tend to be bulky and are formed from excess amounts of material—oftentimes leather.

In addition to the aforementioned issues, the process for manufacturing a headcover also stands to be improved. The process for manufacturing a fitted headcover typically comprises: cutting a one or more sheets of material into a plurality of shaped panels, and then assembling (e.g. hand sewing) the panels together in a manner which forms a contoured internal chamber shaped to receive a particular club head. Additional post-processing steps (e.g. inserting padding, embroidering, waterproofing, etc.) are also often conducted to improve the functional or aesthetic characteristics of the fitted headcover. Each additional processing step increases the amount of time, labor, and materials necessary to manufacture a fitted headcover.

The process of cutting and shaping panels from a material sheet generates scrap material, which must either be discarded or repurposed through an additional processing step, and both outcomes increase the cost of a headcover for manufacturers and consumers alike. Further, this process can be cumbersome to a manufacturer because the quantity of panels, the sizes/shapes of the panels, and the stitching patterns used to assemble the panels are all dependent upon the type/size of headcover being produced. As such, each time a new headcover is to be produced, a manufacturer must divert time and money towards the development and implementation of new procedures. Lastly, recent advancements in golf club engineering have made it increasingly common for golf club heads to possess complex or irregular geometries; however, the known headcover manufacturing methods are not readily capable of producing headcovers that fit snugly upon such clubs.

In view of the aforementioned issues associated with conventional headcovers and their associated methods of manufacture, a need exists for an improved headcover and methods of manufacture that address one or more of the above-identified problems.

SUMMARY

The present invention is directed to golf club headcovers constructed using 3-D printing or another additive manufacturing technique.

In some embodiments, the present disclosure provides a headcover for a golf club that includes a body formed layer by layer along a build plane during an additive manufacturing process. The body includes a head portion and a sleeve portion. The head portion defines a chamber adapted to receive a golf club head and includes an aperture configured to provide access to the chamber. The sleeve portion extends outwardly from the head portion. The head portion and the sleeve portion are at least partially formed from a lattice structure.

In some embodiments, the present disclosure provides a headcover for a golf club that includes a body formed layer by layer along a build plane during an additive manufacturing process, and a lattice structure. The body defines a chamber adapted to receive a golf club head and includes a heel end, a toe end, and a plurality of sidewalls. The lattice structure is formed unitarily on a portion of the body during the additive manufacturing process. The lattice structure extends over at least a portion of each of the plurality of sidewalls and the toe end of the body.

In some embodiments, the present disclosure provides a headcover for a golf club that includes a body formed layer by layer along a build plane during an additive manufacturing process. The body includes a head portion and a sleeve portion. The head portion includes a plurality of side walls and a lattice structure that forms at least a portion of each of the plurality of sidewalls. The sleeve portion extends outwardly from the head portion. The lattice structure extends over a portion of the sleeve portion.

A headcover produced in accordance with the present disclosure may include a body that is additively manufactured, layer by layer, from any 3-D printable material, including, but not limited to: thermoplastics, elastomers, epoxy resins, metals, or metal alloys. In one embodiment, the body may be formed from a flexible a thermoplastic material, such as thermoplastic polyurethane (TPU).

DETAILED DESCRIPTION OF THE DRAWINGS

Figure 1:
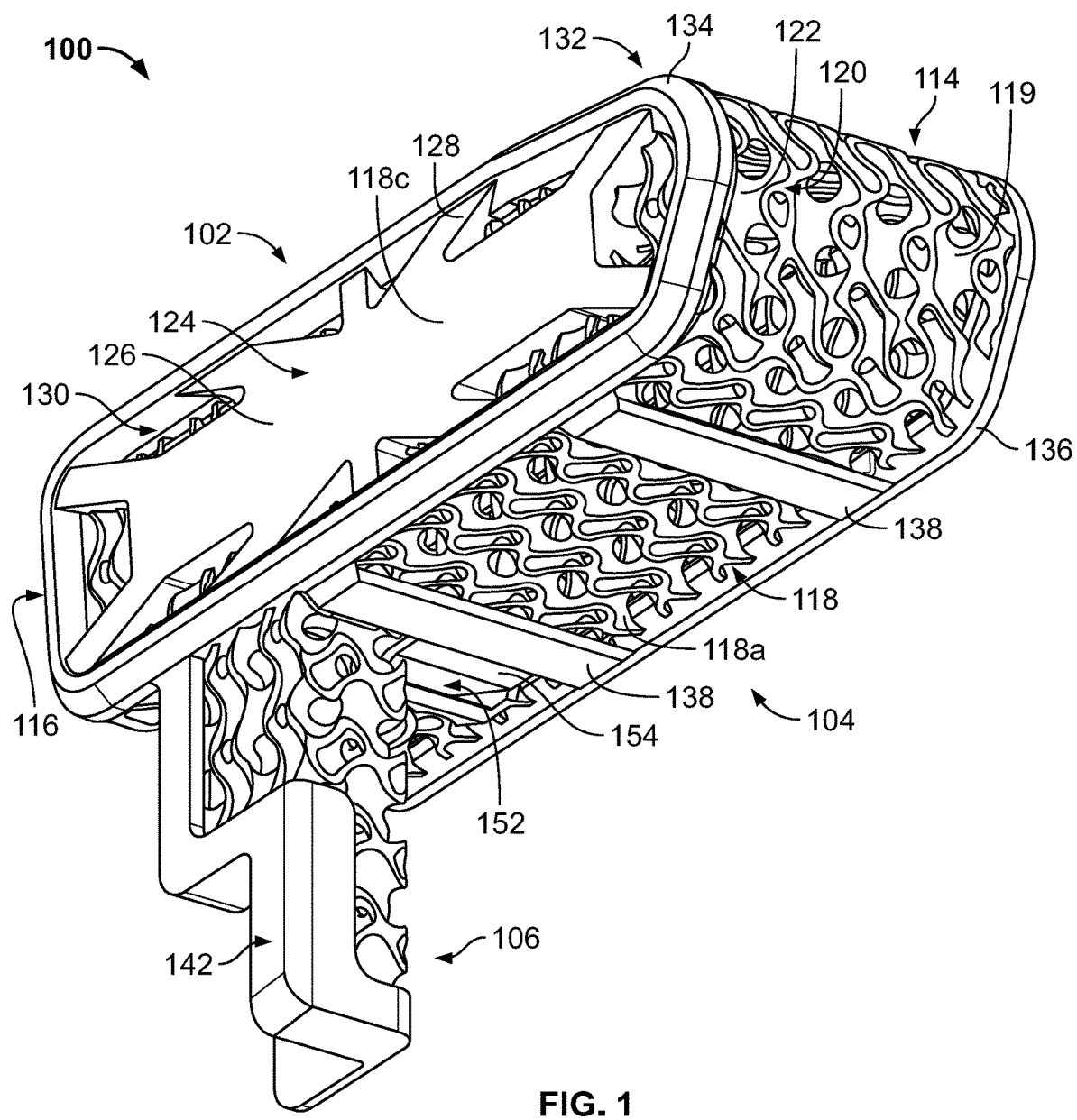
FIG. 1 is a top, front, and right or toe side isometric view of a headcover configured for use with putter-type club in accordance with the present disclosure.

The use of the terms "lattice pattern," "lattice portion," or "lattice structure," herein refer to portions of a golf club headcover that are formed by one of a plurality of interconnected segments, interconnected shapes, interconnected patterns, or connected surfaces that may be formed integrally with the headcover body during an additive manufacturing process. In some embodiments, the lattice structure may define at least one cutout, or absence of material, that is formed within a unit cell (e.g., a repeated pattern defined by the lattice structure).

The present invention generally provides a headcover for protection and storage of a golf club head. In particular, a golf club headcover of the present disclosure includes a body that is formed layer by layer along a build plane during an additive manufacturing process. In some embodiments, a headcover may be formed according to the present disclosure from a flexible thermoplastic material, such as thermoplastic polyurethane (TPU).

In some embodiments, the body may include a lattice structure that is formed layer by layer with the body during an additive manufacturing process and, therefore, is formed integrally with the body. In general, the incorporation of a lattice structure enables various material and/or performance characteristics of a headcover to be selectively manipulated to achieve, for example, stiffness properties, impact attenuation properties (i.e., energy absorption properties), accelerated moisture evaporation, and/or to provide desirable aesthetic qualities. In some embodiments, the body comprises a head portion, which defines an internal chamber for receiving a golf club head, and a sleeve portion that defines a slot that is configured to receive a hosel or shaft portion of a golf club.

A headcover according to the present disclosure may be fabricated using one or more of a variety of additive manufacturing processes. For example, a headcover according to the present disclosure may be at least partially fabricated using a material extrusion additive manufacturing processes that extrudes, fuses, melts, or bonds material filaments layer by layer along a build plane. In some embodiments, thermoplastic filaments, for example, may be deposited from a nozzle of an extruder that builds cross-sections of a golf club headcover layer by layer along a build plane. In some embodiments, the golf club headcovers disclosed herein may be at least partially fabricated using a vat photopolymerization process in which a light source is used to selectively cure cross-sections of the headcover from a vat of photopolymer resin so that that the headcover is built up layer by layer upon a build plane. In some embodiments, the golf club headcovers disclosed herein may be at least partially fabricated using a powder bed fusion additive manufacturing processes that fuses, melts, or bonds powdered material particles layer by layer along a build plane. In some embodiments, the powdered material particles may be melted or fused by a laser that forms cross-sections of a golf club headcover layer by layer along a build plane. In some embodiments, powder particles may be melted or fused by an electron beam or ultrasonic energy to form cross-sections of a golf club headcover layer by layer along a build plane. In some embodiments, the powder particles may be bonded to form cross-sections of a golf club headcover layer by layer along a build plane via the deposit (e.g., printing) of a binder.

The various methods of additive manufacturing used to manufacture a headcover according to the present disclosure may include binder jetting, direct energy deposition, selective laser melting (SLM), direct metal laser sintering (DMLS), fused deposition modeling (FDM), sterolithography (SLA), digital light processing (DLP), continuous liquid interface production (CLIP), daylight polymer printing (DPP), electron beam melting, laser powered bed fusion (LPBF), ultrasonic additive manufacturing, material extrusion, material jetting, Joule printing, electrochemical deposition, cold spray metal printing, DLP metal printing, Ultrasonic Consolidation or Ultrasonic Additive Manufacturing (UAM), LENS laser-based printing, electron beam freeform fabrication (EBF3), laser metal deposition, or carbon fiber additive manufacturing.

In some embodiments, a golf club headcover may be fabricated by multi jet fusion that uses an inkjet array to selectively apply fusing and detailing agents across a bed of nylon powder, which are then fused by heating elements into a solid layer. After each layer, powder is distributed on top of the bed and the process repeats until the part is complete.

It is contemplated that headcovers produced in accordance with the present disclosure may include a body that is additively manufactured from any material or any combination of materials. For example, the body may be additively manufactured from any one or a combination of: polymers, elastomers, composites, ceramics, or metals. In some embodiments, the headcover body is formed from a flexible thermoplastic material. For example, the body may be formed from any one or a combination of thermoplastic elastomers such as thermoplastic polyurethane (TPU), elastomeric polyurethane (EPU), or flexible polyurethane (FPU), or thermoplastic polymers such as acrylonitrile butadiene styrene (ABS), polylactic acid (PLA), polycarbonate, or nylon, or any other suitable material.

In one embodiment, a headcover according to the present disclosure may be formed from thermoplastic polyurethane (TPU). 3-D printed TPU has many material properties that make it desirable when considered for use as a headcover. For example, TPU has high abrasion resistance, high shear strength, and high elasticity, all of which are beneficial for increasing the functional lifespan of a headcover. Headcovers that are additively manufactured from TPU may retain their three-dimensional shape when removed from the golf club head. However, TPU headcovers are also substantially elastic and may deform during insertion or removal of a club head. Compared to materials used to fabricate conventional headcovers (e.g., leather or neoprene), the increased elasticity of TPU can reduce the amplitude of peak stresses, which are imparted upon the headcover during normal use. This may prevent premature wear on a headcover or make it easier for a golfer remove the headcover. Further, additively manufactured headcovers may be configured to fit snugly upon any given golf club head, even those that have a complex or irregular external geometries.

In some embodiments, the present invention may provide a headcover including a lattice structure that provides a window into the headcover. The window may allow a golfer to view the head of a club without removing the headcover, and this may eliminate the otherwise necessary guesswork involved in selecting a particular club from a plurality of covered clubs.

The use of a lattice structure within a headcover may allow various manufacturing and performance characteristics to be modified or customized. For example, a lattice structure may define a substantially reduced weight or density when compared to a solid material (e.g., solid plastic, solid metal, etc.). The placement of a lattice structure within a headcover may be varied using an additive manufacturing process to selectively reduce the overall volume of material needed to manufacture the headcover and/or to promote certain functional characteristics in portions of the headcover. In some embodiments, a lattice structure may be more flexible than solid structure. As such, incorporating flexible lattice structures into areas of a headcover that may be frequently subjected to tensile, shear, or compressive stresses may increase the lifespan of the headcover.

In the field of additive manufacturing, lattice structures often comprise a repeating pattern of unit cells having regular geometric shapes (e.g. cubes, stars, triangles, octagons, hexagons, etc.). However, sometimes the unit cells may not have a recognizable shape or an easily discernable pattern. It is contemplated that headcovers in accordance with the present disclosure should not be limited to any particular pattern, unit cell shape, or unit cell structure. For example, a logo, word, or phrase may be repeated in a desired pattern to form a lattice structure according to the present disclosure. In some embodiments, the lattice structure or pattern formed on a headcover according to the present disclosure can be customized to meet an end user's or consumer's demand. For example, a consumer may be able to place an online order for a headcover with a alma mater logo. Alternatively or additionally, headcovers may be customized to include a lattice structure or pattern for specific events to include one or more tournament logos or company logos.

In some embodiments, a three-dimensional orientation of the unit cells within a lattice structure of a headcover may be varied. For example, when a lattice structure is subjected to directional loading, its mechanical response may be dependent upon the orientation of the comprising unit cells. As such, a manufacturer may construct a unit cell orientation that yields the most desirable mechanical response to anticipated directional loads.

In some embodiments according to the present disclosure, a headcover may include a body having a gyroid lattice structure. Gyroid lattice structures may define exceptional strength properties at low densities and may define desirable sheer strength properties. In general, a gyroid lattice may be defined as being composed of triply periodic minimal surfaces. Minimal surfaces have a zero mean curvature (i.e. all points on the surface are equally concave and convex) and they have a locally minimized surface area extending across a given boundary. The unit cells of a gyroid lattice are composed entirely from smooth, rounded shapes, so the gyroid lattice is devoid of any sharp corners. It is therefore contemplated that a headcover additively manufactured to include a gyroid lattice structure may have fewer locations subjected to sharp corner stress concentrations compared to headcovers that are manufactured using conventional methods. Consequently, headcovers of the present disclosure may demonstrate a higher fatigue strength when compared with conventional headcovers. Experimental testing has also demonstrated that gyroid lattice structures demonstrate consistent stiffness and deflection properties.

In addition to lattice structures, solid structures or frames (e.g., solid material structures that are formed layer by layer) may be also incorporated into the body of a headcover. Solid structures may provide enhanced structural rigidity to the headcover to help it maintain its shape upon removal from a club head. In some embodiments, solid structures may be provided in areas of the headcover to provide a flat surface upon which a logo, a numerical identifier or other embellishments may be provided. In some embodiments, solid structures may be included within areas of the headcover to provide enhanced coverage in order to better protect critical portions of the club head, such as the striking face.

Referring now to FIGS. 1-11, various views of a headcover 100 configured for use with a putter-type golf club are shown in accordance with the present disclosure. In the illustrated embodiment, the headcover 100 may include a body 102 that is formed as a unitary component layer by layer along a build plane during an additive manufacturing process.

The body 102 generally defines a head portion 104 and a sleeve portion 106. Advantageously, the additive manufacturing process allows the head portion 104 and the sleeve portion 106 to be formed integrally as a unitary body that is built layer by layer upon a build plane, which may reduce both manufacturing time and material costs in addition to other advantages.

Figure 2:
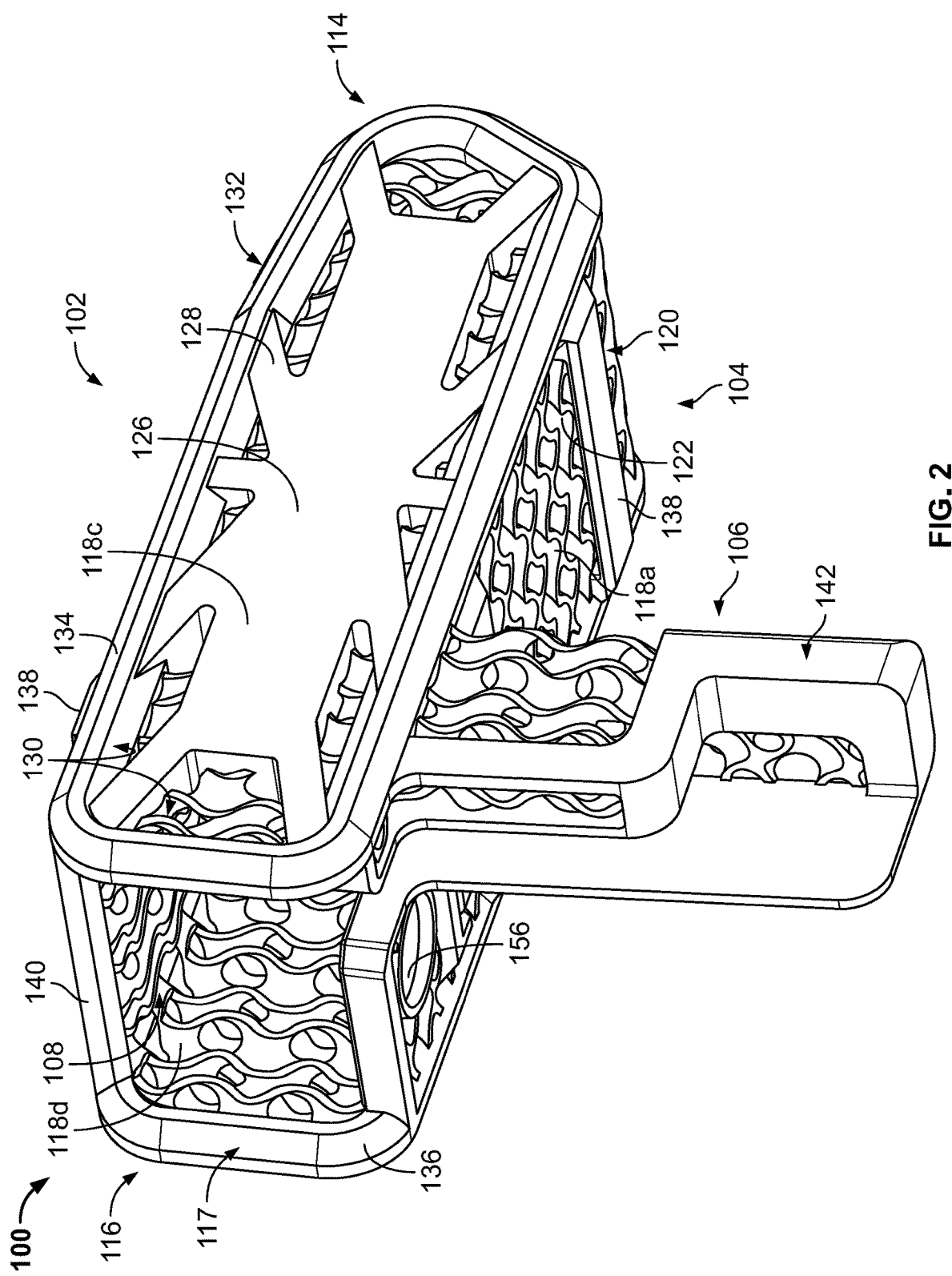
FIG. 2 is a top, front, and left or heel side isometric view of the headcover of FIG. 1.
Figure 3:
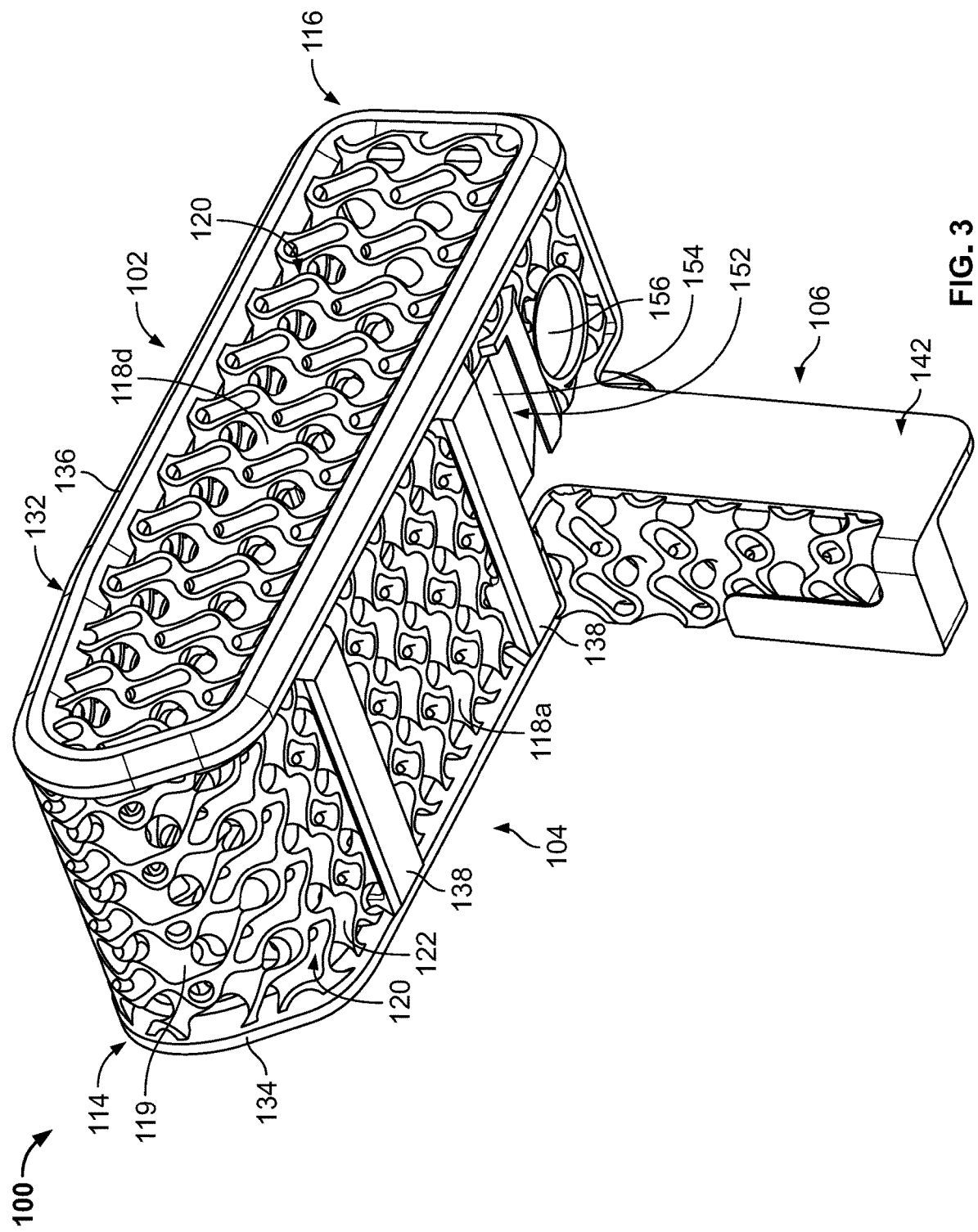
FIG. 3 is a top, rear, and right or toe side isometric view the headcover of FIG. 1.
Figure 10:
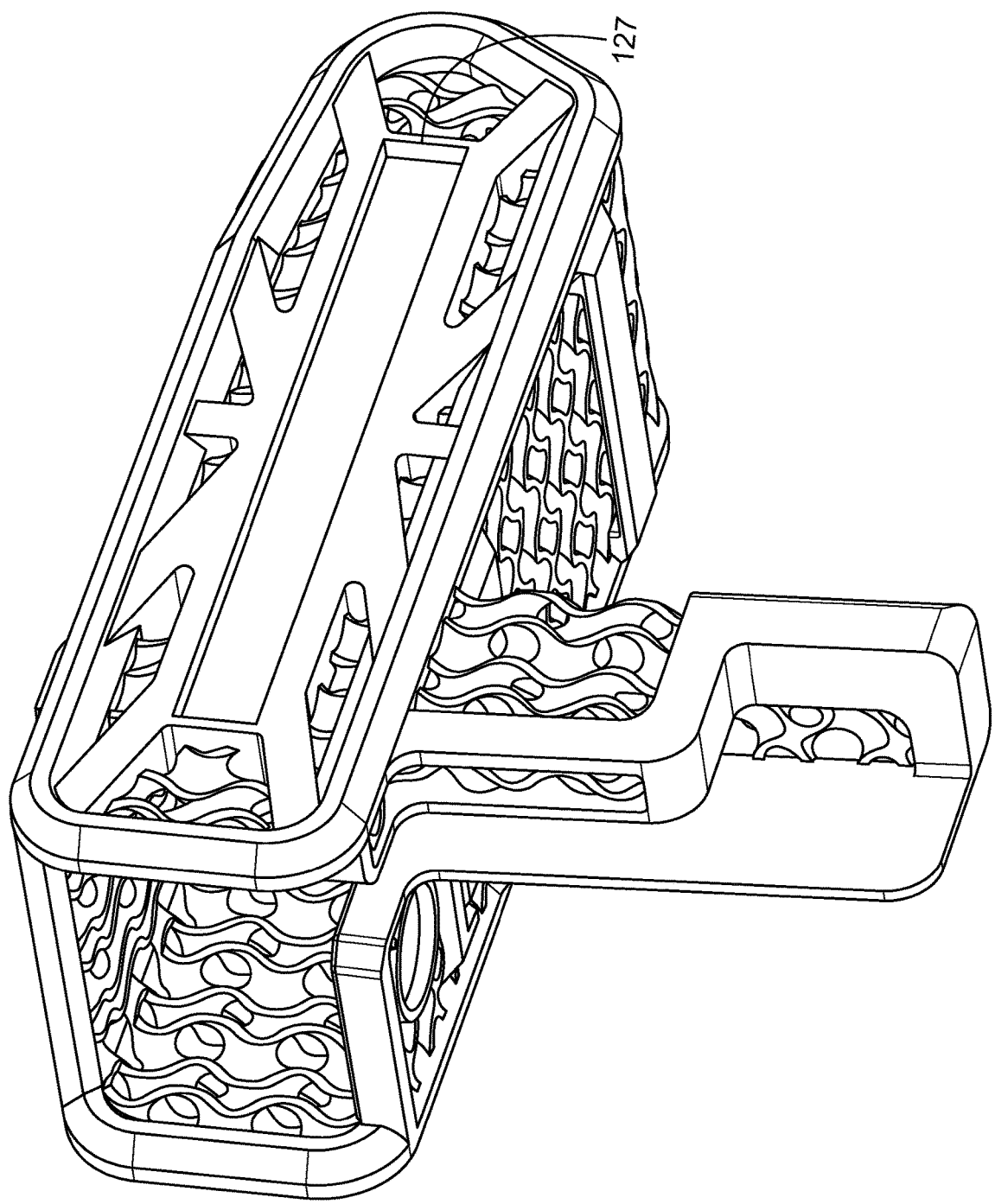
FIG. 10 is a top, front, left or heel side isometric view of the headcover of FIG. 1 including a pocket or recess.

The head portion 104 defines a chamber 108 that is configured to receive a head of a golf club (see FIGS. 2 and 10). The head portion 104 may define an opening 110 through which the head of a golf club may be inserted into or removed from the chamber 108. The sleeve portion 106 extends from the head portion 104 and defines a generally U-shaped slot 112 that is configured to receive an elongate portion of a golf club, such as a hosel and/or a portion of the club shaft (see FIGS. 7 and 11).

The body 102 may include a toe end 114, a heel end 116, and a plurality of sidewalls 118 extending between the toe end 114 and the heel end 116. The chamber 108 is defined or enclosed by the plurality of sidewalls 118 and the toe end 114. In general, the heel end 116 of the body 102 may be generally open and provide access to the chamber 108. For example, the body 102 may include an aperture or cutout 117 formed in the heel end 116 that is defined by portions of the head portion 104 and the sleeve portion 106.

In the illustrated embodiments of FIGS. 1-9, the plurality of sidewalls 118 include a top or crown wall 118a, a bottom or sole wall 118b, a front wall 118c, and a rear wall 118d. The toe end 114 of the head portion 104 may include a toe wall 119 extend around the toe end 114 between the top wall 118a and the bottom wall 118b. In some embodiments, the headcover 100 may include fewer or more walls extending between the toe end 114 and the heel end 116 to accommodate the shape defined by of the golf club head for which the headcover is configured to receive. For example, a headcover configured to receive a club head having a complex external geometry may be additively manufactured to include more or fewer sides so that the internal geometry of the chamber 108 generally conforms to the external geometry of the golf club head. Alternatively or additionally, the headcover 100 may be designed to receive and cover a golf club head for any type of golf club (e.g., a wood-type golf club, a driver-type golf club, a hybrid-type golf club, an iron-type golf club, or a wedge-type golf club). In some embodiments, an outer geometry of the body 102 (e.g., the plurality of sidewalls 118) may generally conform to an external geometry defined by the golf club head adapted to be inserted into the headcover 100. In some embodiments, the chamber 108 may define an internal geometry that conforms to the external geometry of the golf club head adapted to be inserted therein, and the outer geometry of the body 102 (e.g., the plurality of sidewalls 118) may define any geometry (e.g., a logo or a structure or shape that mimics a logo, word, or pattern).

In the illustrated embodiment, the body 102 may include or be formed at least partially by a lattice structure 120. In some embodiments, the lattice structure 120 may define a gyroid pattern or a gyroid unit cell. The lattice structure 120 may include a plurality of continuous or interconnected sheets or struts 122, which are generally rounded or curved and include a plurality of apertures and/or slots formed therein. In general, the rounded or curved shape defined by the sheets or struts 122 in the lattice structure 120 may be beneficial for avoiding sharp-corner stress concentrations within areas of the headcover 100. In some embodiments, the lattice structure 120 may define alternative shapes and structures. For example, the lattice structure 120 may include a plurality of interconnected beams that form a diamond-, a triangular-, a rectangular-, a square-, a pentagonal-, a hexagonal-, or a polygonal-shaped unit cell. In some embodiments, the unit cell shape defined by the lattice structure 120 can be formed by interconnected shapes (e.g., ovals, circles, or another geometric shape) with varying orientation to form a repeated pattern, or unit cell. In some embodiments, the unit cell defined by the lattice structure 120 can be formed by an interconnected word or phrase (e.g., the word "putter" or another word describing the golf club being covered by the headcover may be repeated in a lattice pattern or structure).

In some embodiments, the lattice structure 120 may form the entirety or a substantial portion of the top wall 118a, the bottom wall 118b, the rear wall 118d, and the toe wall 119. In the illustrated embodiment, the front wall 118c may include a faceplate 124 that is formed of solid material. The faceplate 124 may include a center portion 126 and a plurality of arms 128 that extend outwardly from the center portion 126 at various locations around the center portion 126 and connect to a peripheral boundary of the front wall 118c (see FIGS. 1, 2, and 4). The faceplate 124 may provide increased coverage, and therefore increased protection, for a ball-striking face of a golf club head. Further, the faceplate 124 may provide a solid surface, upon which a logo, nameplate, or design may be provided.

Figure 4:
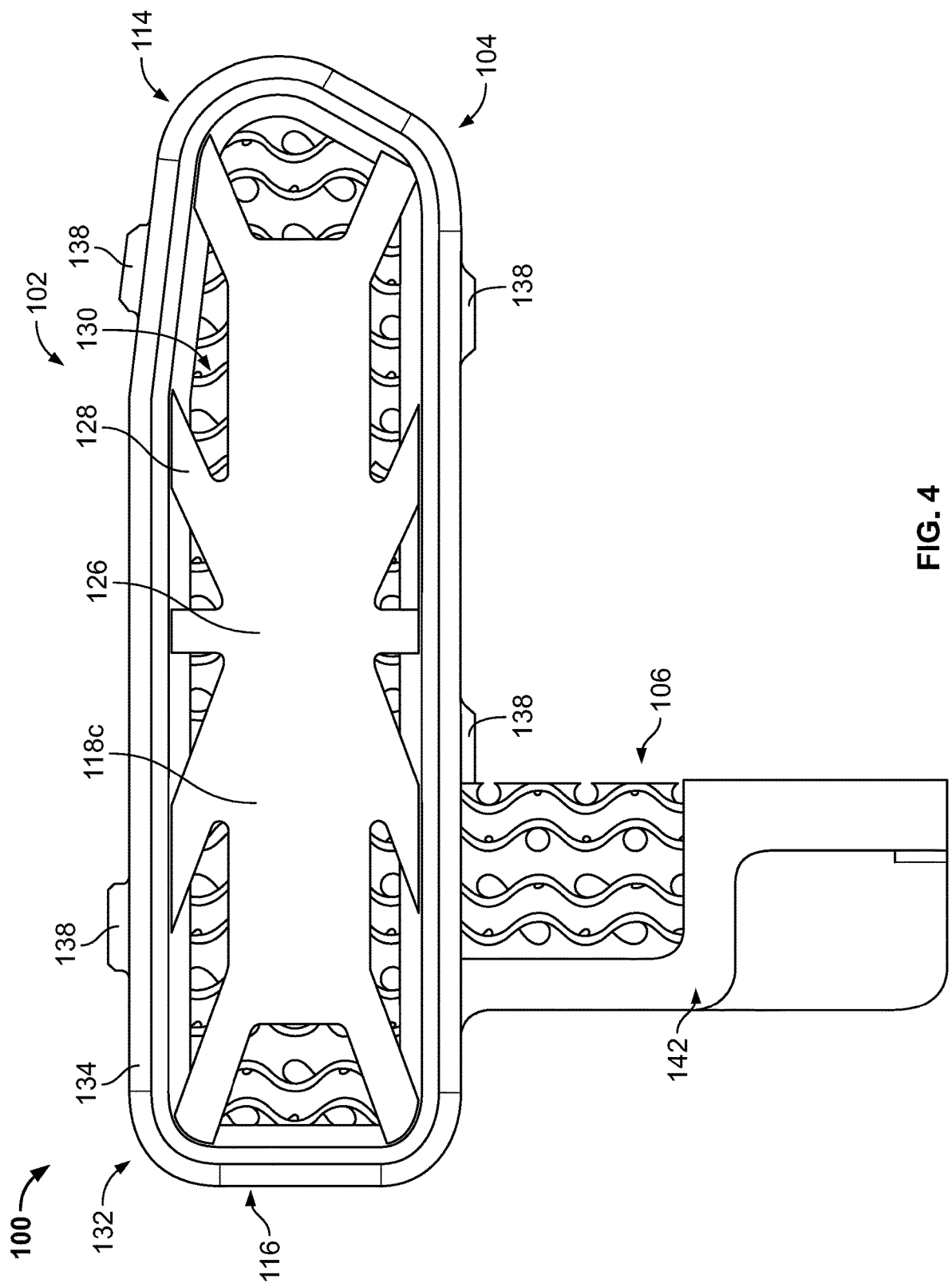
FIG. 4 is a front view of the headcover of FIG. 1.
Figure 5:
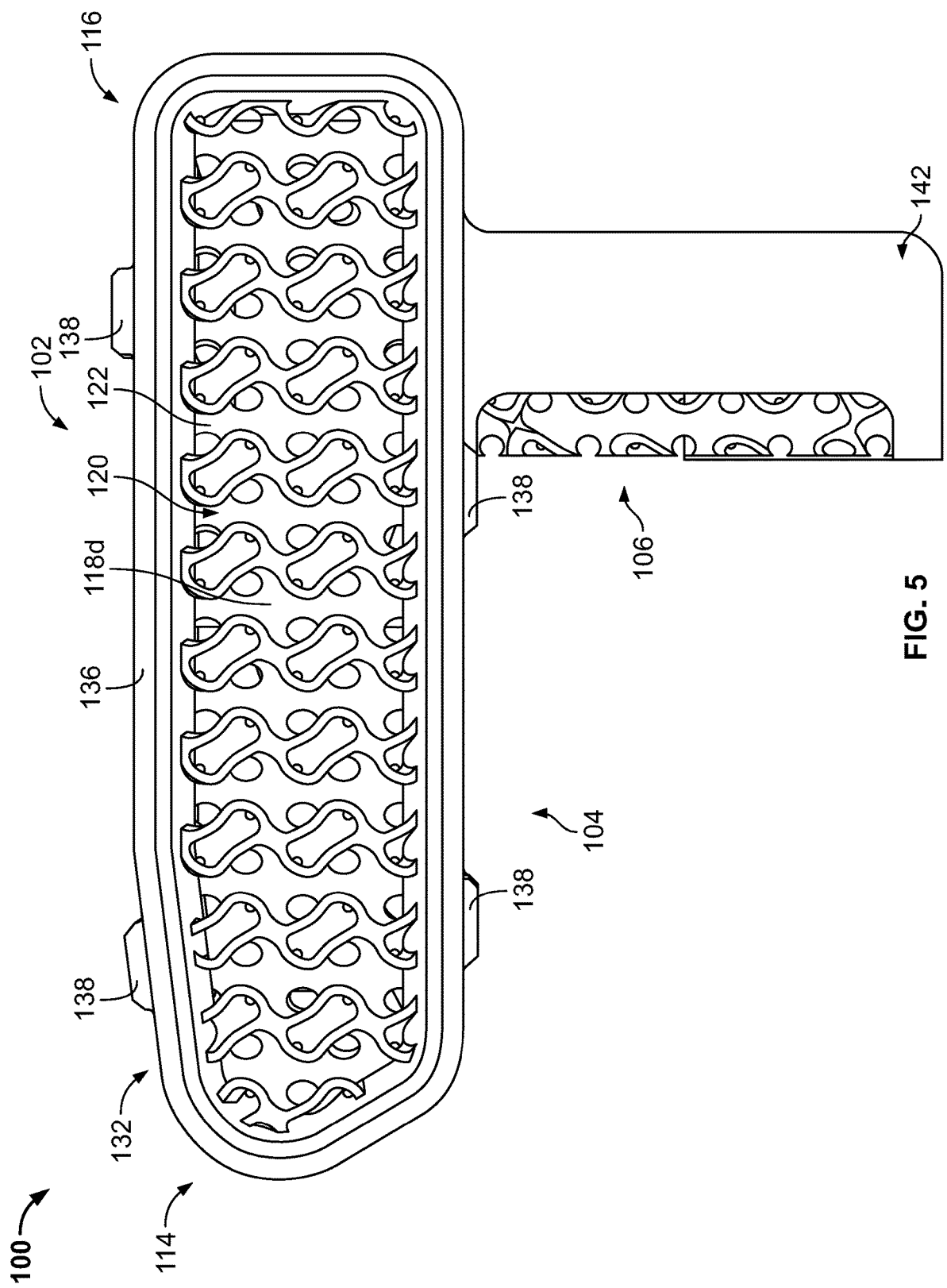
FIG. 5 is a rear view of the headcover of FIG. 1.
Figure 6:
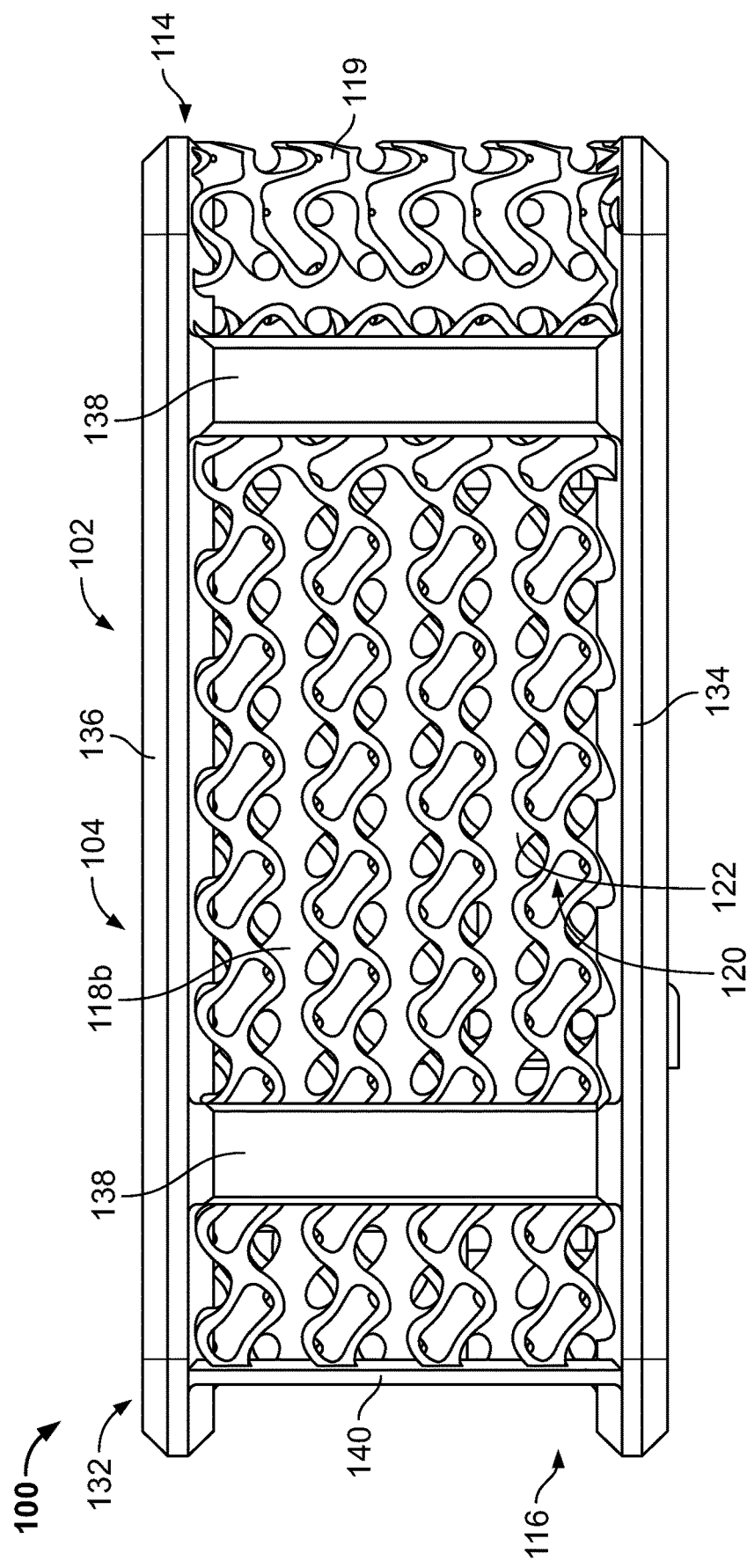
FIG. 6 bottom plan view of the headcover of FIG. 1.
Figure 7:
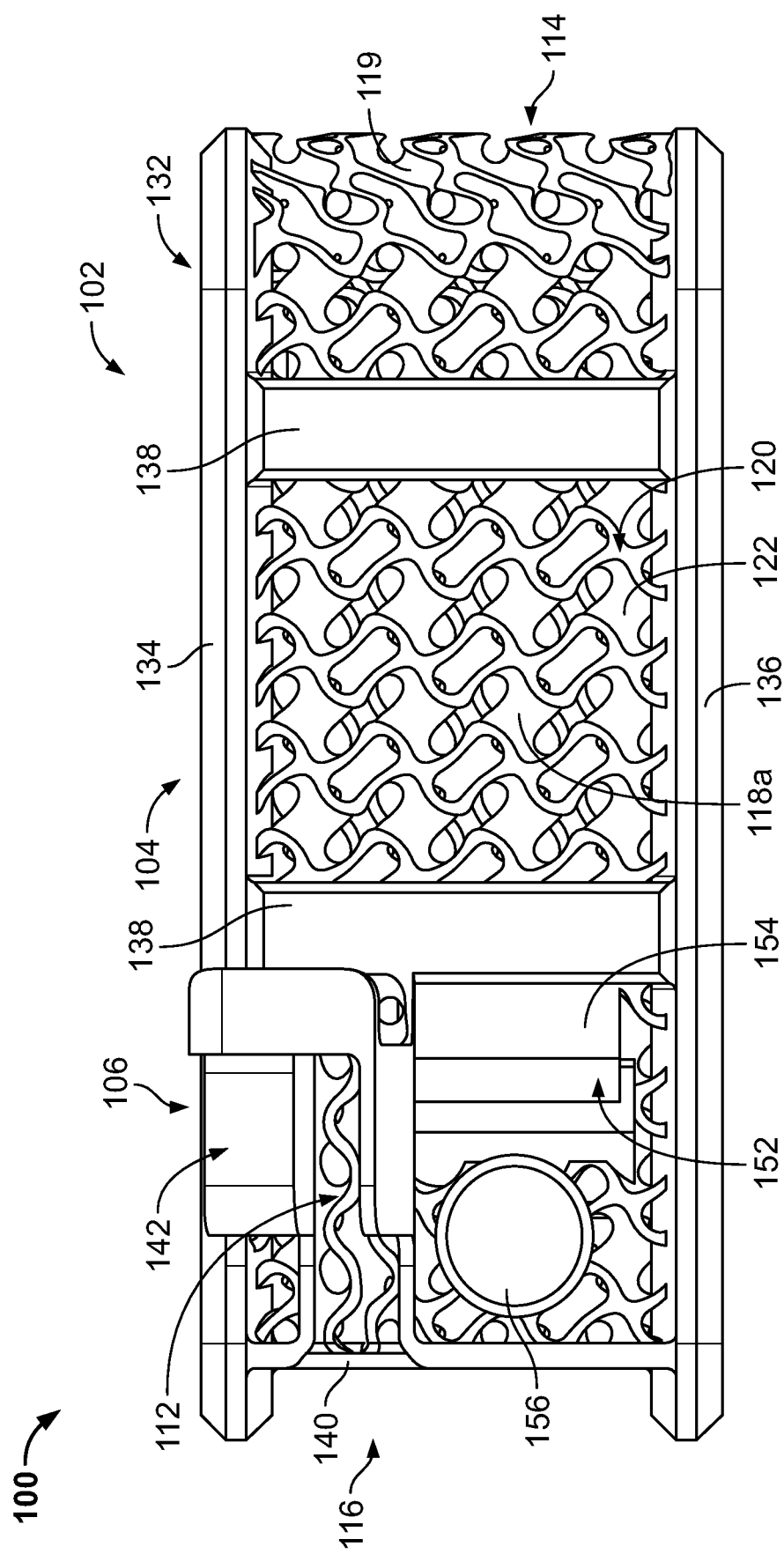
FIG. 7 is a top plan view of the headcover of FIG. 1.
Figure 8:
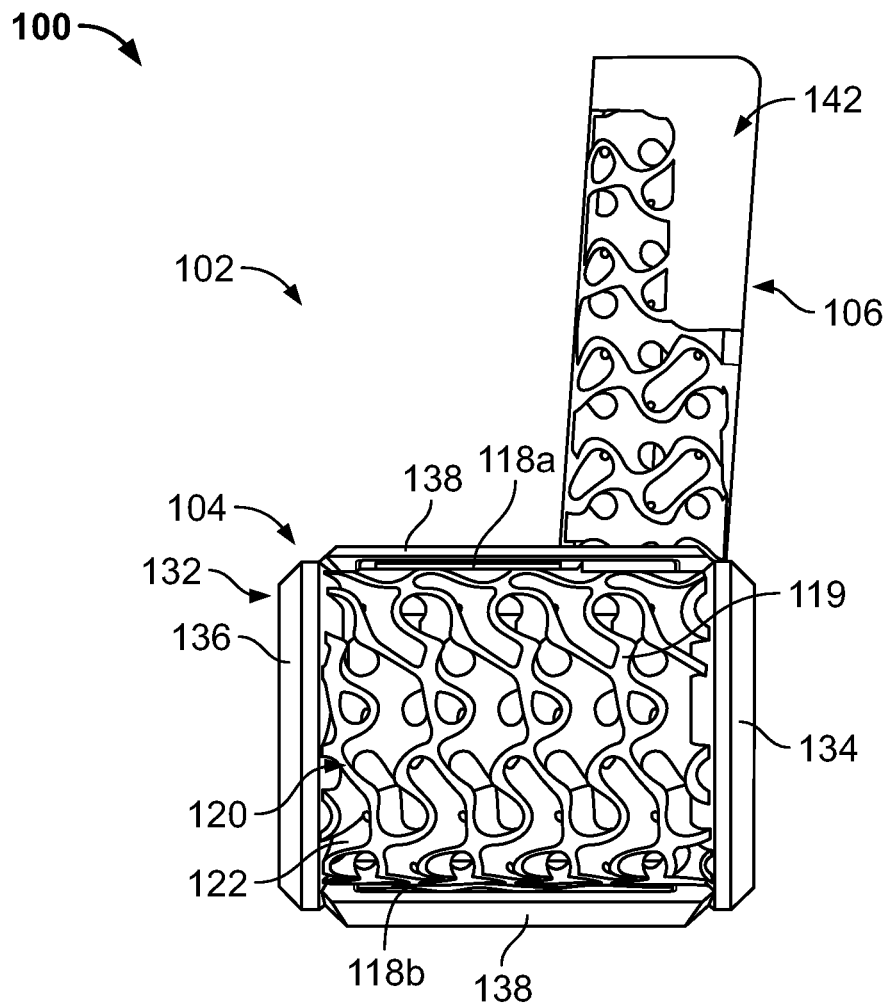
FIG. 8 is a right or toe side view of the headcover of FIG. 1.
Figure 9:
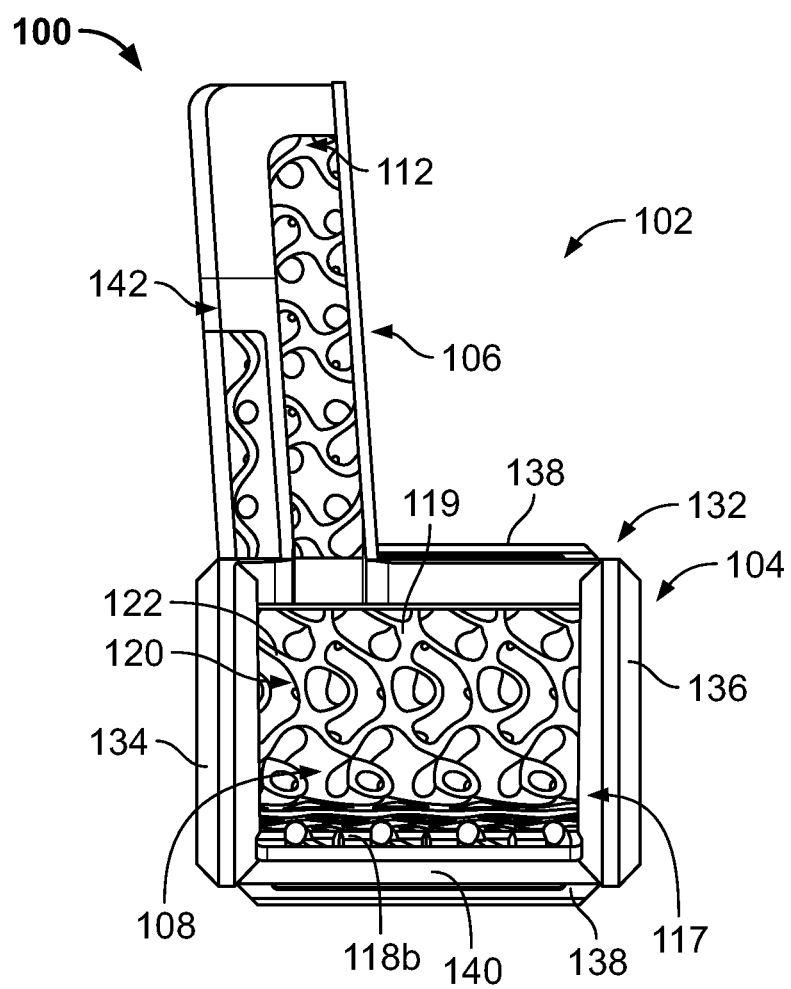
FIG. 9 is left or heel side view of the headcover of FIG. 1.

In some embodiments, the front wall 118c may be formed by the lattice structure 120 and the faceplate 124 with the lattice structure 120 being arranged in gaps 130 defined by the outer boundary of the center portion 126, the peripheral boundary of the front wall 118c, and adjacent pairs of the plurality of arms 128 (see FIGS. 1, 2, and 4). In some embodiments, the lattice structure 120 may extend over an entirety of the front wall 118c and the faceplate 124 may be arranged over or in front of the lattice structure 120. In some embodiments, the front wall 118c may only include the lattice structure 120 and the faceplate 124 may be arranged on another surface of the body 102, or the faceplate 124 may be omitted from the body 102.

Figure 11:
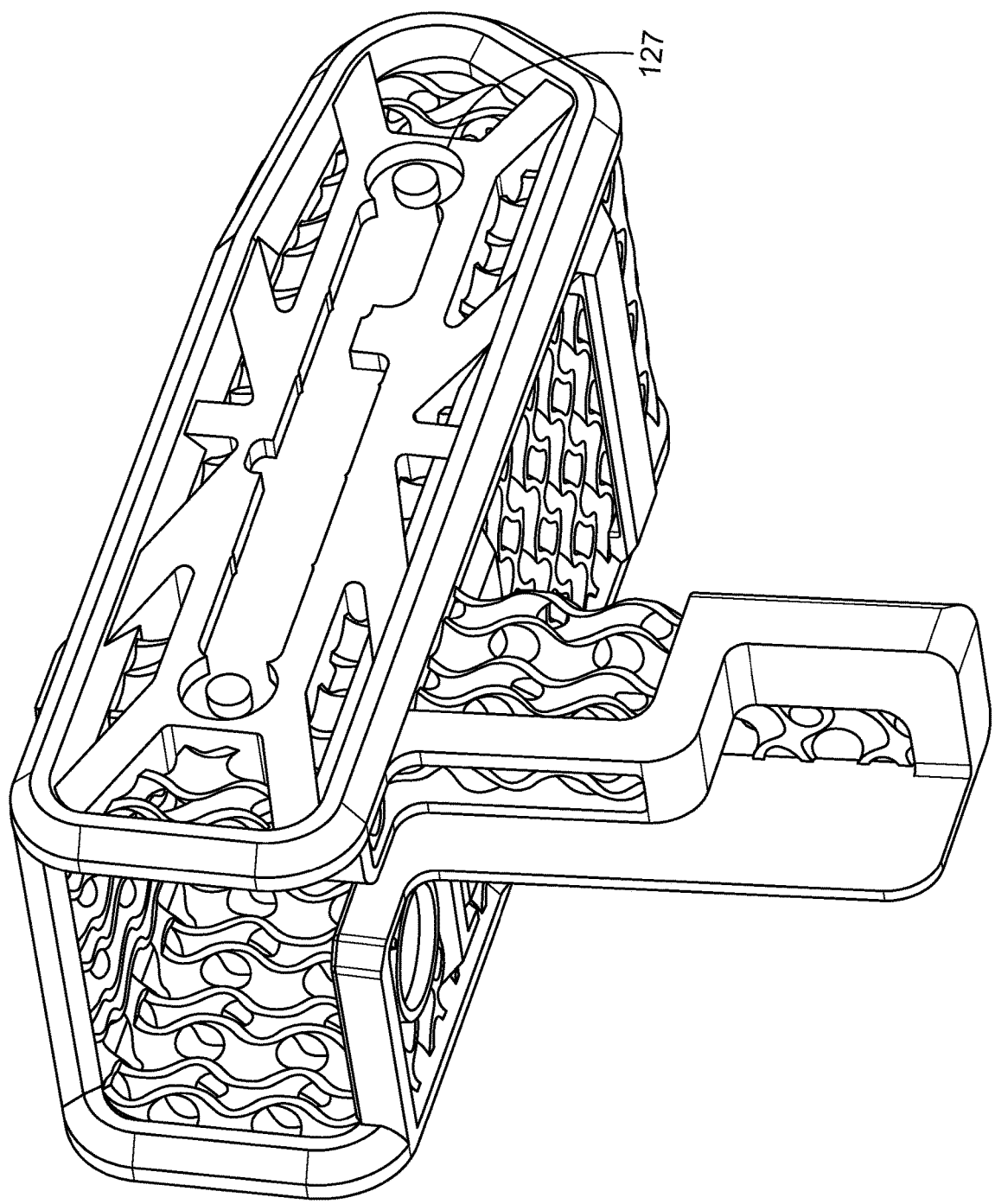
FIG. 11 is a top, front, left or heel side isometric view of the headcover of FIG. 10 including a shaped pocket or recess.
Figure 12:
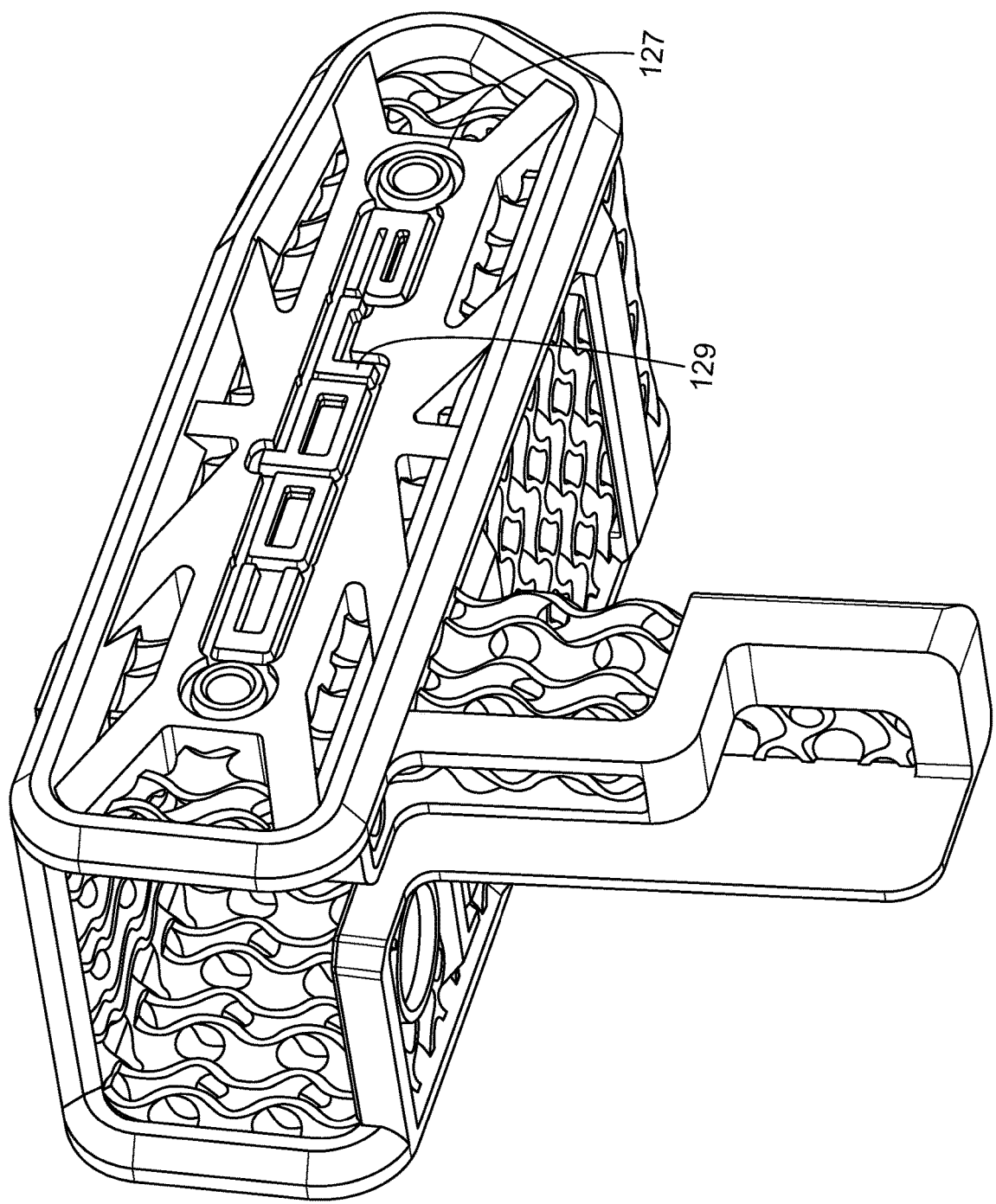
FIG. 12 is a top, front, left or heel side isometric view of the headcover of FIG. 11 with a medallion receiving with in the pocket or recess.
Figure 13:
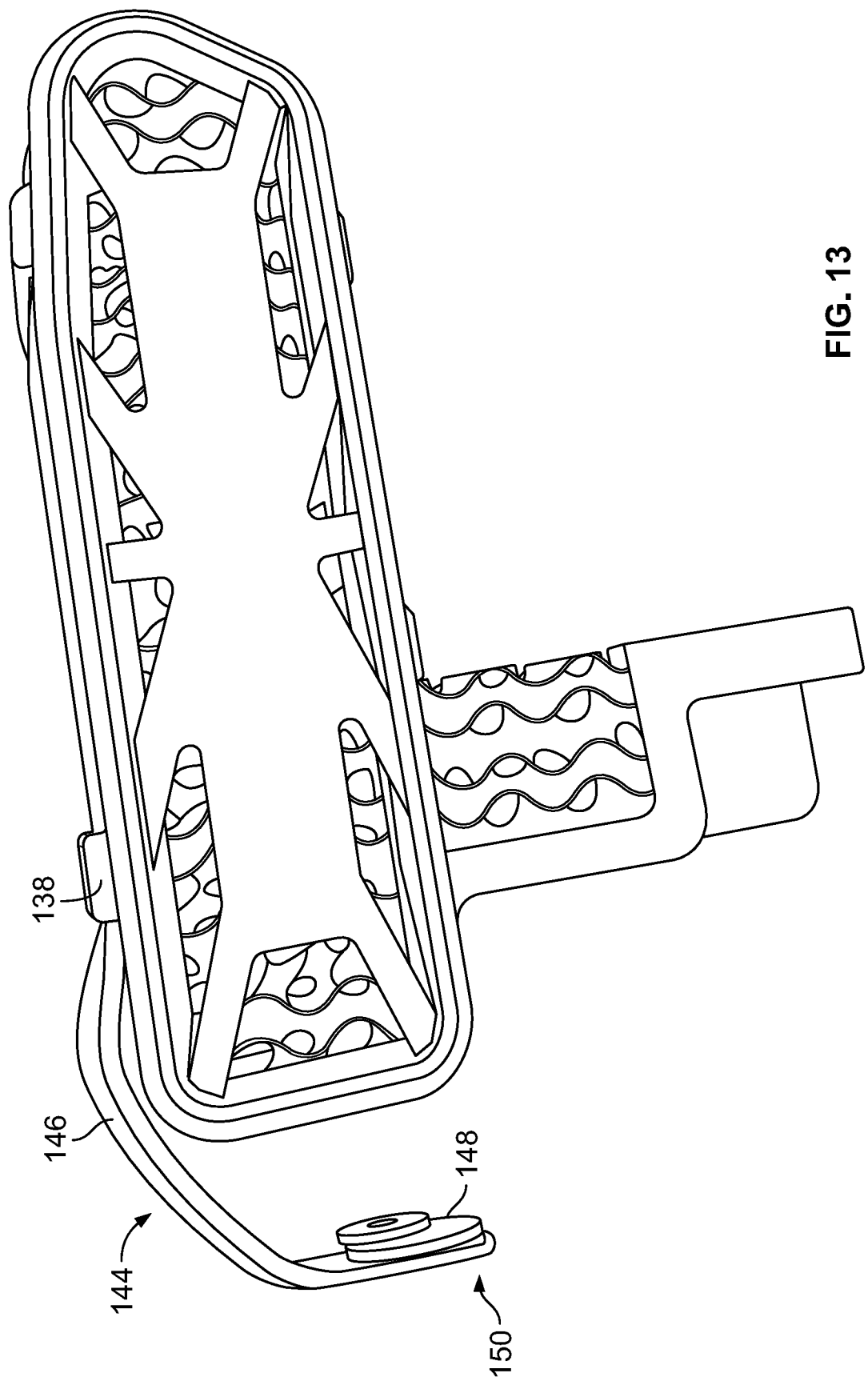
FIG. 13 is a front view a headcover comprising the headcover of FIG. 1 following assembly with a fastening member in a first state.
Figure 14:
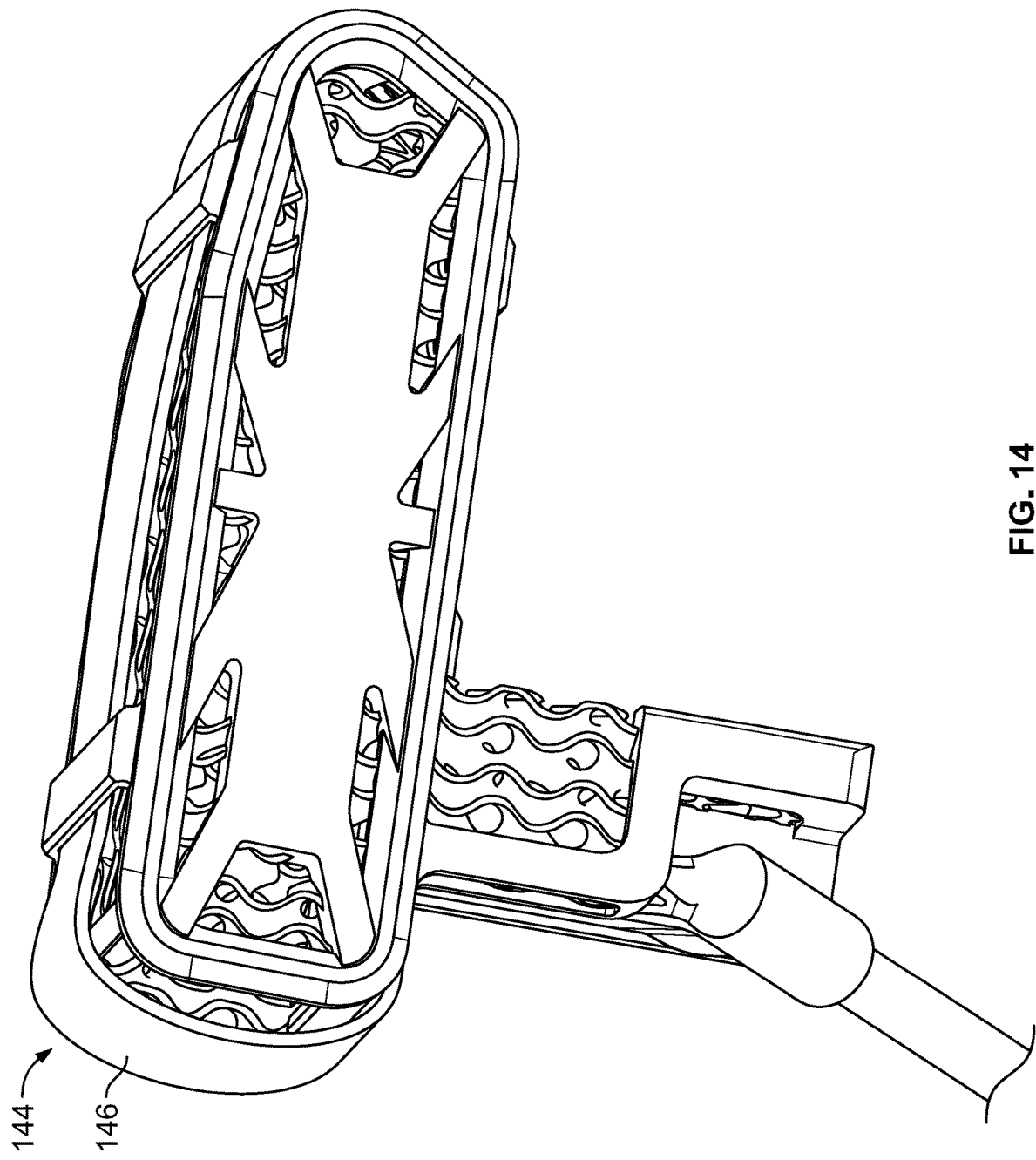
FIG. 14 is a bottom, front, and left or heel side isometric view of the headcover of FIG. 10 with the fastening member in a second state after a golf club head has been inserted into the headcover.

In some embodiments, at least a portion of the faceplate 124 and/or the center portion 126 may include a pocket or recess within which a medallion may be fastened. For example, FIG. 10 illustrates a pocket or recess 127 formed in the faceplate 124. The pocket or recess 127 is recessed into the faceplate 124 and may be configured to receive a medallion or another emblem or logo therein. In the illustrated embodiment, the pocket or recess 127 may define a generally rectangular shape. In some embodiments, the pocket or recess 127 may define any shape, for example, to conform to an outer periphery of the medallion received therein. For example, FIGS. 11 and 12 illustrate a pocket or recess 127 that defines a shape that generally conforms to an outer periphery of a medallion 129 inserted therein. In some embodiments, the medallion 129 may include an adhesive that enables the medallion to be attached to a surface that defines the pocket or recess 127. In some embodiments, the medallion may be in the shape of a word or a logo. In some embodiments, the medallion may be fabricated from a metal material or a plastic material. In the illustrated embodiment, the medallion 129 may include a logo or word and one or more shapes or other structures on opposing ends of the logo or word.

With reference back to FIGS. 1-9, in the illustrated embodiment, the head portion 104 of the body 102 includes a frame 132 that is formed layer by layer with the body 102 during the additive manufacturing process. In general, the frame 132 may be formed of solid material and may provide structural stability to the body 102 and aid in the body 102 maintaining its general shape in a resting state (e.g., without a golf club head received therein). The frame 132 may include a first support beam 134, a second support beam 136, a plurality of transverse support beams 138, and a heel beam 140. In the illustrated embodiment, the first support beam 134 extends around a periphery of the front wall 118c (see FIGS. 1, 2, and 4), and the second support beam 136 extends around a periphery of the rear wall 118d.

In the illustrated embodiment, the frame 132 includes four transverse support beams 138 that extend transversely between the first support beam 134 and the second support beam 136. For example, the frame 132 includes two transverse support beams 138 that are spaced from one another and extend along the top wall 118a between the first support beam 134 and the second support beam 136, and two transverse support beams 138 that are spaced from one another and extend along the bottom wall 118b between the first support beam 134 and the second support beam 136. In some embodiments, the frame 132 may include more or less transverse support beams 138 arranged in any location along the outer surface of the head portion 104.

The heel beam 140 may extend transversely between the first support beam 134 and the second support beam 136 adjacent to the heel end 116. The heel beam 140 may form a portion of the aperture or cutout 117 configured to provide access to the chamber 108. The aperture or cutout 117 may also be defined by portions of the first support beam 134 and the second support beam 136 that are arranged adjacent to the heel end 116 and that extend between the top wall 118a and the bottom wall 118b. Further, the aperture or cutout 117 may be defined by a sleeve frame 142 formed in the sleeve portion 106. The sleeve frame 142 may be formed of solid material and may extend from the second support beam 136 along the top wall 118a adjacent to the heel end 116, up and around the sleeve portion 106, and back down along the top wall 118a to the first support beam 134. In general, the portion of the aperture or cutout 117 formed in the head portion 104 may conform to an exterior shape of the golf club head that is configured to be protected by the headcover 100. The portion of the aperture or cutout 117 formed by the sleeve portion 106 may conform to a hosel or shaft that extends from the golf club head that is configured to be protected by the headcover 100. In some embodiments, the headcover 100 may not include the sleeve portion 106, for example, to accommodate a golf club head that does not include a hosel (e.g., a putter-type golf club where the shaft directly mounts to the golf club head).

In the illustrated embodiment, the sleeve portion 106 extends upwardly from the top wall 118a of the body 102 adjacent to the heel end 116. The lattice structure 120 may extend throughout the sleeve portion 106 in locations where the sleeve frame 142 is absent. In other words, the lattice structure 120 may fill in the spaced outlined by and arranged between the sleeve frame 142 and the top wall 118a.

In some embodiments, the headcover 100 may include a fastening element to removably couple to a portion of the body 102 and aid in securing a golf club head within the chamber 108. For example, with reference to FIGS. 10 and 11, the headcover 100 may include a fastening element 144 having a flexible strap 146 with a magnet 148 attached to a free end 150 thereof. The body 102 may include one or more attachment features (e.g., features which are formed layer by layer with the body 102) that allow the body 102 to retain and removably couple to the fastening element 144.

Referring to FIGS. 1-3, 7, 10, and 11, in the illustrated embodiment, the body 102 may include a groove 152, a clip 154, and a recess 156. The clip 154 may be formed in the top wall 118a of the body 102, and the clip 154 may define the groove 152 extending therethrough. The groove 152 may extend through the clip 154 at an angle relative to the top wall 118a. For example, the groove 152 may be arranged at an angle between a line normal to the top wall 118a and a line parallel to the top wall 118a. In some embodiments, the groove 152 and the clip 154 may be configured to receive an end of the flexible strap 146 (e.g., an end opposite to the free end 150) to couple the end of the flexible strap 146 to the body 102. For example, the groove 152 may be designed such that the groove 152 and/or the clip 154 elastically deform when the end of the flexible strap 146 is inserted therein, and the elastic recoil of the clip 154 may exert a pinching force upon the flexible strap 146, thereby coupling the end of the flexible strap 146 to the body 102. In some embodiments, the body 102 may include other attachment mechanisms to couple the end of the flexible strap 146 to the body 102 (e.g., snaps, buttons, quick-disconnects, fasteners, buckles, hook and loop fasteners, clips, grommets, snap fasteners, or any other suitable coupling).

The magnet 148 arranged on the free end 150 may be configured to be selectively coupled to the recess 156 formed in the body 102. In the illustrated embodiment, the recess 156 is arranged on the top wall 118a adjacent to the heel end 116 (see FIGS. 2, 3, and 7). The recess 156 may define a shape that conforms to the shape of the magnet 148 and allows the magnet 148 to be at least partially received therein. The recess 156 may extend partially into the top wall 118a, and the recess 156 may include a magnetic metal material secured therein to enable the magnet 148 to be magnetically retained within the recess 156.

With specific reference to FIGS. 10 and 11, the fastening element 144 may be coupled to the body 102 by initially sliding the end of the flexible strap 146 opposite to the free end 150 around the body 102 and under the transverse support beams 138. The end of the flexible strap 146 may then be inserted through the groove 152 formed in the clip 154 to secure the end of the flexible strap 146 to the body 102. The transverse support beams 138 may aid in retaining the flexible strap 146 in a close arrangement with the outer periphery of the body 102. With the flexible strap 146 inserted around the body 102 under the transverse support beams 138 and secured by the clip 154, the free end 150 of the flexible strap 146 may be free floating (see FIG. 10), which enables a user to manipulate the free end 150 and selectively couple it to the body 102. For example, the free end 150 of the flexible strap 146 may be selectively moveable between a first state where the free end 150 is uncoupled from the body 102 (see FIG. 10), and a second state where the free end 150 is coupled to the body 102 (see FIG. 11).

For example, with the free end 150 in the first state, a user may insert a golf club head through the aperture or cutout 117 and into the chamber 108 defined by the body 102. With the golf club head and hosel/shaft received within the body 102, the user may then manipulate the free end 150 of the flexible strap 146, for example, by inserting the magnet 148 into the recess 156 to magnetically couple the free end 150 to the body 102 to transition the free end 150 to the second state. With the free end 150 in the second state, the golf club head may be retained within the body 102. A user may selectively manipulate the free end 150, for example, by pulling the magnet 148 out of the recess 156 with enough force to overcome the magnetic attraction therebetween to uncouple the free end 150 from the body 102 and allow a user to remove the golf club head from the headcover 100.

Figure 15:
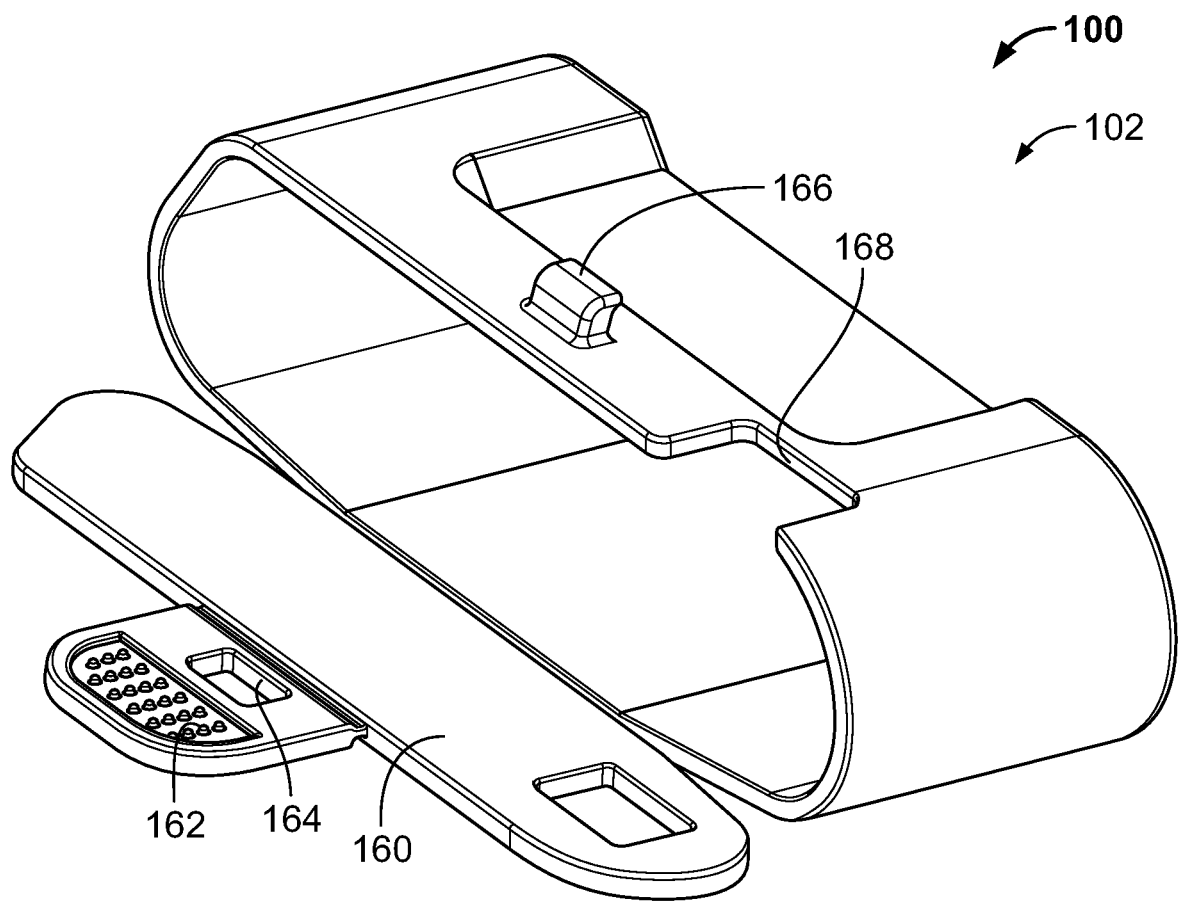
FIG. 15 is a top, front, left isometric view of a headcover including a hinge.
Figure 16:
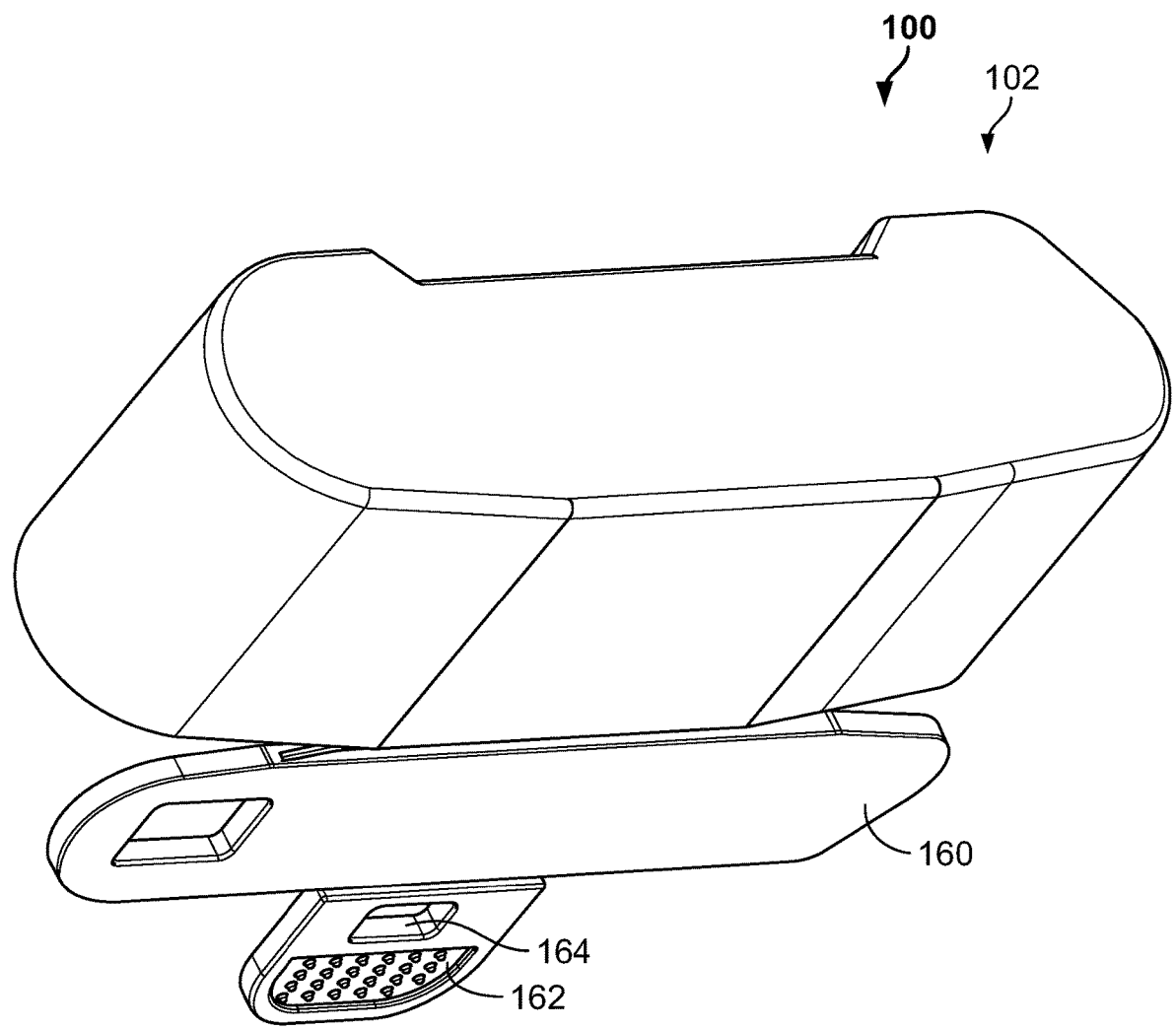
FIG. 16 is a bottom, back, left isometric view of the headcover of FIG. 15.

In some embodiments, the headcover 100 may not include the fastening element 144 and may instead include a fold, hinge, or a clasp that is formed integrally with the body 102, layer by layer, during an additive manufacturing process. For example, FIGS. 15 and 16 illustrate an embodiment of the headcover 100 that includes a unitary body 102 that is formed to generally enclose a golf club head. The body 102 includes a hinge 160 that is formed layer by layer with the body 102 during an additive manufacturing process. In some embodiments, the hinge 160 may be formed as one of the sidewalls in the body 102. For example, in the illustrated embodiment, the front wall 118c is connected to the body 102 so that the front wall 118c can hinge or pivot relative to the body 102. The front wall 118c may be pivotally coupled to the body 102 so that the front wall 118c can pivot between an open position (FIGS. 15 and 16) where access is provided to the internal chamber 108, and a closed position where the front wall 118c is pivoted toward the body 102 and generally closes the chamber 108 within the body 102.

In the illustrated embodiment, the hinge 160 may include a clasp that is formed by a strap 162 and a tab 166. The strap 162 is attached to the upper edge of the front wall 118c and includes a cutout 164 that extends through the strap 162. In the illustrated embodiment, the strap 162 may include textured features (e.g., a plurality of bumps or nubs) to aid a user in grasping or gripping the strap 162. The tab 166 may generally protrude upwardly from the top wall 118a. In general, the clasp may be used to secure the hinge 160 in the closed positon. For example, once the front wall 118c is pivoted to the closed position, the strap 162 may be placed over the tab 166 so that the tab 166 extends through the cutout 164 to secure or hold the hinge 160 in the closed positon. To open the hinge 160, a user may then grasp and move the strap 162 so that the tab 166 is removed from the cutout 164, which leaves the front wall 118c free to pivot to the open position. In the illustrated embodiment, the top wall 118a may include a notch 168 formed therein that is configured to receive a hosel or shaft extending from a golf club head.

Any of the embodiments described herein may be modified to include any of the structures or methodologies disclosed in connection with different embodiments. Further, the present disclosure is not limited to headcovers of the type specifically shown. Still further, aspects of headcover in accordance with any of the embodiments disclosed herein may be modified to work with a variety of golf clubs.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. Various features and advantages of the invention are set forth in the following claims.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. A headcover for a golf club, comprising:
   a body formed layer by layer along a build plane during an additive manufacturing process, the body including:
      a head portion defining a chamber adapted to receive a golf club head and including a body aperture disposed at a heel end of the head portion that is configured to provide access to the chamber; and
      a hosel portion extending outwardly from the head portion,
   wherein the head portion and the hosel portion of the body are defined by a lattice structure,
   wherein the lattice structure comprises a gyroid pattern,
   wherein a unit cell of the gyroid pattern includes a continuous network of interconnected concave and convex surfaces,
   wherein a hosel cutout is defined by a hosel frame at a heel end of the hosel portion, and
   wherein the body aperture and the hosel cutout are in direct fluid communication with one another and are configured to receive the golf club.

2. The headcover of claim 1, wherein the body includes a front wall, a rear wall, a top wall, and a bottom wall, and
   wherein the lattice structure extends over at least a portion of the front wall, the rear wall, the top wall, and the bottom wall.

3. The headcover of claim 2, wherein the body includes a frame formed from a solid material and having a first support beam extending around a periphery of the front wall and a second support beam extending around a periphery of the rear wall.

4. The headcover of claim 3, wherein the frame further includes a plurality of transverse support beams extending between the first support beam and the second support beam.

5. The headcover of claim 1, further comprising a fastening element including an end and a free end,
   wherein the end is coupled to the body and the free end is moveable between a first state where the free end is uncoupled from the body and a second state where the free end is coupled to the body.

6. The headcover of claim 5, wherein the free end of the fastening element includes a magnet that is configured to be selectively coupled to a recess formed in the body.

7. A headcover for a golf club, comprising:
   a body formed layer by layer along a build plane during an additive manufacturing process, the body defining a chamber adapted to receive a golf club head and including a heel end, a toe end, and a plurality of sidewalls; and
   a lattice structure formed unitarily on a portion of the body during the additive manufacturing process, wherein the lattice structure includes a plurality of cutouts and extends over at least a portion of each of the plurality of sidewalls and the toe end of the body, wherein the lattice structure comprises a gyroid pattern
   wherein at least one of the plurality of sidewalls includes a front wall having a faceplate,
   wherein the body includes a frame having a first support beam extending around a periphery of a front wall,
   wherein the faceplate includes a center portion and a plurality of arms that extend outwardly from the center portion and connect to the frame at the periphery of the front wall,
   wherein a portion of the lattice structure is arranged between the faceplate and the frame at the periphery of the front wall, and
   wherein the arms of the plurality of arms are spaced apart by at least one air gap.

8. The headcover of claim 7, wherein the lattice structure comprises gyroid pattern.

9. The headcover of claim 7, wherein the plurality of sidewalls include the front wall, a rear wall, a top wall, and a bottom wall.

10. The headcover of claim 9, wherein a second support beam extends extending around a periphery of the rear wall.

11. The headcover of claim 7, wherein the frame further includes a plurality of transverse support beams extending between the first support beam and the second support beam.

12. The headcover of claim 7, further comprising a fastening element including an end and a free end, wherein the end is coupled to the body and the free end is moveable between a first state where the free end is uncoupled from the body and a second state where the free end is coupled to the body.

13. The headcover of claim 12, wherein the free end of the fastening element includes a magnet that is configured to be selectively coupled to a recess formed in the body.

14. The headcover of claim 7, wherein a body aperture and a hosel cutout extends between a hosel frame of a hosel portion and a heel beam disposed along the heel end of the body.

15. A headcover for a golf club, comprising:
a body formed layer by layer along a build plane during an additive manufacturing process, the body including:
a head portion including a plurality of sidewalls and a lattice structure that forms at least a portion of each of the plurality of sidewalls; and
a sleeve portion extending outwardly from the head portion, wherein the lattice structure extends over a portion of the sleeve portion,
wherein the body includes a solid frame that is interconnected with at least one gyroid structure,
wherein the solid frame includes a first support beam and a second support beam with at least one air gap disposed therebetween,
wherein at least two transverse support beams extend between the first support beam and the second support beam along a top wall, the at least two transverse beams being spaced apart from one another and at least partially spaced from a perimeter of the top wall, and
wherein the solid frame defines a chamber that is configured to receive the golf club.

16. The headcover of claim 15, wherein the lattice structure comprises a gyroid pattern.

17. The headcover of claim 15, further comprising a fastening element including an end and a free end, wherein the end is coupled to the body and the free end is moveable between a first state where the free end is uncoupled from the body and a second state where the free end is coupled to the body.

18. The headcover of claim 17, wherein the free end of the fastening element includes a magnet that is configured to be selectively coupled to a recess formed in the body.

19. The headcover of claim 17, wherein the solid frame of the body includes a groove that is configured to receive the free end of the fastening element.

20. The headcover of claim 15, wherein the solid frame defines a cutout, the cutout disposed at a heel end of the body, and
wherein the cutout extends between a bottom wall and the sleeve portion.

* * * * *

UNITED STATES PATENT AND TRADEMARK OFFICE
CERTIFICATE OF CORRECTION

| | | |
|---|---|---|
| PATENT NO. | : 12,109,469 B2 | |
| APPLICATION NO. | : 17/012837 | |
| DATED | : October 8, 2024 | |
| INVENTOR(S) | : Ryan L. Roach et al. | |

It is certified that error appears in the above-identified patent and that said Letters Patent is hereby corrected as shown below:

In the Claims

Column 12, Claim 10, Line 55, "extends extending around" should be --extends around--.

Signed and Sealed this
Third Day of December, 2024

Katherine Kelly Vidal
*Director of the United States Patent and Trademark Office*